W. B. KING.
NUT LOCK DEVICE.
APPLICATION FILED OCT. 19, 1920.
1,368,440.
Patented Feb. 15, 1921.
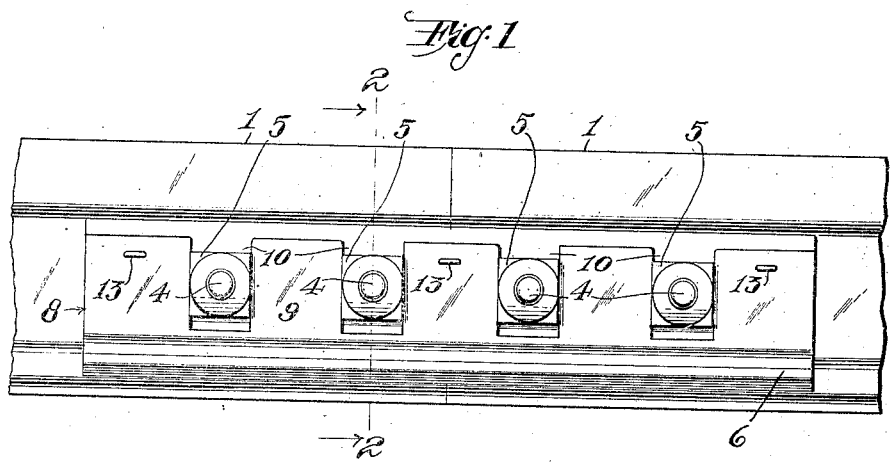
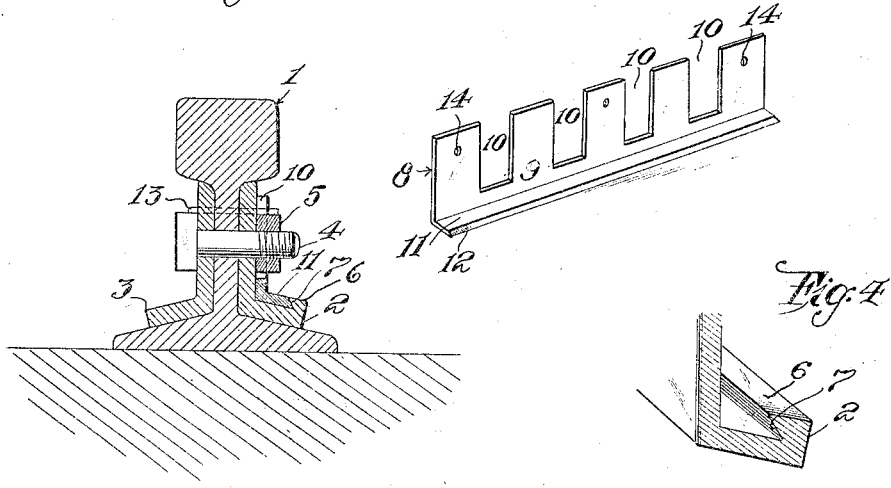
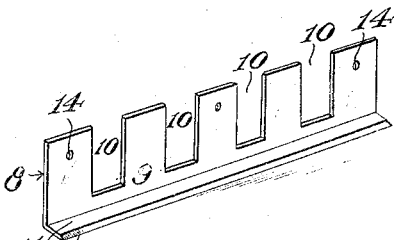
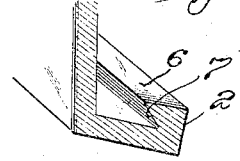
INVENTOR.
W. B. King
BY
his ATTORNEYS.

UNITED STATES PATENT OFFICE.

WESLEY B. KING, OF LEASBURG, MISSOURI.

NUT-LOCK DEVICE.

1,368,440.    Specification of Letters Patent.    Patented Feb. 15, 1921.

Application filed October 19, 1920. Serial No. 417,982.

*To all whom it may concern:*

Be it known that I, WESLEY B. KING, a citizen of the United States, residing at Leasburg, in the county of Crawford and State of Missouri, have invented certain new and useful Improvements in Nut-Lock Devices, of which the following is a specification, reference being had therein to the accompanying drawings.

This invention relates to a nut lock device, and has for its object the construction of a simple and efficient device for retaining nuts upon bolts, which bolts are used for fastening fish plates and rails together.

With this and other objects in view, my invention comprises certain novel combinations, constructions and arrangements of parts as will be hereinafter described, illustrated in the accompanying drawings, and more particularly pointed out in the appended claims.

In the drawings:

Figure 1 is a view in side elevation of a device constructed in accordance with the present invention, while Fig. 2 is a section taken on line 2—2, Fig. 1, and looking in the direction of the arrows.

Fig. 3 is a perspective view of a locking plate.

Fig. 4 is a fragmentary, perspective view of the primary fish plate.

Referring to the drawings by numerals, 1 designates the rails, and 2 is the primary fish plate, and 3 is the auxiliary fish plate. Extending through the web of the rails 1 and the fish plates are bolts 4, upon which bolts are threaded the nuts 5.

The primary fish plate 2 is provided on its base, at its outer, longitudinal edge, with an upstanding flange 6, and this flange is provided with a downwardly, inwardly beveled edge 7.

The locking plate 8 comprises a vertical body 9 having slots 10 formed therein, in which slots 10 are positioned the nuts 5, Figs. 1 and 2; by reason of the slots having parallel sides, rotation of the nuts 5 upon bolts 4 will be prevented when the locking plate is in position, as shown in Figs. 1 and 2. The locking plate is provided with a horizontal flange 11, and the flange 11 is provided with an outer, beveled edge 12, which edge 12 extends to and engages the beveled, inner edge 7 of the upstanding flange 6, when the parts are assembled, as shown in Fig. 2. The body of the primary fish plate, together with its base and the upstanding flange 6 produces a pocket, in which the lower portion of the locking plate is securely retained, by reason of the beveled engaging faces or edges of the flanges 6 and 11.

It is to be understood that to remove the locking plate 8, the cotter pins 13 have to be first removed, and then the top part of the plate moved outwardly from the rails, so that the lower portions of the slots 10 clear the lower portions of the nuts, whereupon the locking plate 8 can be entirely removed off the primary fish plate 2. To insert the locking plate 8 upon the fish plate 2, the lower part of the locking plate is first placed in position upon the primary fish plate 2, and then the plate is forced at its upper end against the fish plate, so that the bolts and nuts enter the slots 10, whereupon the cotter pins 13 are placed in the apertures 14 for positively holding the locking plate in its assembled position with the other parts.

Suitable fastening means, such as cotter pins 13 extend through the apertures 14 (Fig. 3) in the locking plate 8 and into or through the fish plates and the web of the rails, assisting in fastening the locking plate in position, especially at its upper portion, whereas, the lower or bottom portion of the plate is held in position by the beveled structure of the engaging flanges 6 and 11.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In a device of the class described, the combination with rails, of a primary and an auxiliary fish plate upon said rails, bolts extending through said fish plates and rails, nuts threaded on said bolts against the primary fish plate, said primary fish plate provided on its base at its outer edge with an upstanding flange, said flange provided with a downwardly-extending, inwardly-beveled edge, a locking plate having a body with a plurality of slots and with a horizontal base flange, the locking plate positioned against the primary fish plate, said nuts in the slots of the locking plate, said base flange of the locking plate resting upon the base of the primary fish plate, said horizontal flange of the locking plate provided with an outer beveled edge engaging the inner beveled edge of the upstanding flange of the primary fish plate, said locking plate provided in its body with horizontal apertures, and cotter pins extending through said apertures and into the fish plates and the rails, substantially as shown and described.

2. In a device of the class described, the combination with rails, fish plates on said rails, bolts through said rails and fish plates, nuts on said bolts, of a locking plate against one of said fish plates and holding the nuts against rotary movement upon the bolts, said locking plate and engaged fish plate provided with engaged beveled edges locking the lower edge of the locking plate upon the fish plate, and detachable fastening means securing the upper portion of the locking plate against accidental displacement from the fish plate.

In testimony whereof I hereunto affix my signature.

WESLEY B. KING.